United States Patent

Bülow

[11] Patent Number: 5,774,246
[45] Date of Patent: Jun. 30, 1998

[54] APPARATUS FOR DEMULTIPLEXING AN OPTICAL DIGITAL SIGNAL

[75] Inventor: Henning Bülow, Stuttgart, Germany

[73] Assignee: Alcatel N.V., Rijswijk, Netherlands

[21] Appl. No.: 623,159

[22] Filed: Mar. 28, 1996

[30] Foreign Application Priority Data

Mar. 30, 1995 [DE] Germany .................. 195 11 819.7

[51] Int. Cl.$^6$ ........................... H04J 14/08; H04B 10/06; H03L 7/083
[52] U.S. Cl. ........................ 359/139; 359/158; 359/162
[58] Field of Search .................................. 359/117, 194, 359/138, 139, 158, 162; 375/376; 370/516

[56] References Cited

U.S. PATENT DOCUMENTS

| | | | |
|---|---|---|---|
| 4,709,417 | 11/1987 | Kuwabara | 359/180 |
| 4,959,828 | 9/1990 | Austin . | |
| 4,980,891 | 12/1990 | Izadpanah | 359/138 |
| 4,991,975 | 2/1991 | Alferness et al. . | |
| 5,220,448 | 6/1993 | Vogel et al. | 359/139 |
| 5,513,030 | 4/1996 | Epworth | 359/162 |
| 5,574,588 | 11/1996 | Kawanishi et al. | 359/162 |

FOREIGN PATENT DOCUMENTS

| | | |
|---|---|---|
| 0645907 | 3/1995 | European Pat. Off. . |
| 2736955 | 3/1979 | Germany . |
| 4103687 | 8/1992 | Germany . |
| 4335591 | 5/1994 | Germany . |
| 9006640 | 6/1990 | WIPO . |

OTHER PUBLICATIONS

"Distribution of millimetre radiowave signals with an MQW electroabsorption modulator", Electronic Letters, 1 Sep. 1994, vol. 30, No. 18, p. 1522–1524.

Linmann, Otto, "Fernsehtechnik ohne Ballast", Francis–Verlag, Munchen, Aufl.11, 1976 S. 118.

"10–GHz timing extraction from a 20–Gbit/s optical data stream by using a newly proposed optical phase–locked loop", OFC '94 Technical Digest, pp. 62 and 62. by T. Saito et al.

"Demonstration of the Optical Kerr Effect in an All–Fibre Mach–Zehnder Interferometer at Laser Diode Powers", Electronic Letters, 17th Mar. 1988, vol. 24, No. 6, pp. 340–341, White.

Primary Examiner—Leslie Pascal
Attorney, Agent, or Firm—Ware, Fressola, Van der Sluys & Adolphson LLP

[57] ABSTRACT

A demultiplexing apparatus is disclosed which comprises a pulse generator (4), a phase control device (3), and an optical switching device (1), e.g., a NOLM. The phase control device (3) controls the pulse generator (4), whose pulse initiates switching operations in the optical switching device (1) depending on the magnitude of an electric signal derived from the output (8) of the optical switching device (1). The phase control device (3) includes a noise source (26) which disturbs the pulse in a defined manner.

6 Claims, 1 Drawing Sheet

APPARATUS FOR DEMULTIPLEXING AN OPTICAL DIGITAL SIGNAL

TECHNICAL FIELD

The present invention relates to a fixed-bit-rate apparatus for demultiplexing an optical digital signal comprising an optical switching device having an input for the optical digital signal, an input for repetitive pulses produced by a pulse generator, and an output for a portion of the optical digital signal.

BACKGROUND OF THE INVENTION

Such a demultiplexing apparatus is known, for example, from T. Saito et al., "10-GHz timing extraction from a 20-Gbit/s optical data stream by using a newly proposed optical phase-locked loop", OFC '94 Technical Digest, pages 61 and 62. FIG. 1 of that article shows an experimental setup in which a receiver contains an optical phase-locked loop and a nonlinear optical loop mirror (NOLM) acting as a demultiplexer. The NOLM demultiplexer has an input for a 20-Gb/s optical signal and an input for a pulse generated by an optical pulse generator. The optical phase-locked loop derives a 10-GHz signal from the 20-Gb/s optical signal. This electric signal drives the optical pulse generator, whose optical pulse has a repetition rate of 10 GHz. An output of the NOLM demultiplexer provides a portion of the optical signal, and this portion has a bit rate of 10 Gb/s.

The NOLM demultiplexer removes every other bit from the 20-Gb/s optical signal, so that the 10-Gb/s optical signal is produced. To permit an exact removal of the bits, the optical pulses provided by the pulse generator must be synchronous with every other bit. This is achieved by means of the optical phase-locked loop.

The operation of a NOLM as a demultiplexer is known: In the NOLM, the optical signal is split into a clockwise circulating component and a counterclockwise circulating component which can beat with one another in a coupling region. With no optical switching pulse applied, the two counterpropagating light components are in phase after one circulation, i.e., $\Delta \rho = 0$. If an optical pulse is applied in such a way that a pulse and a light component circulate in the same direction and synchronously, the light component will be shifted in phase by $\Delta \rho = -\pi$, i.e., the light component propagating parallel to the pulse will be delayed (dependence of the refractive index on the optical power, Kerr effect).

The optical phase-locked loop shown in FIG. 1 of the above article requires complex circuitry, since it must be suitable for high-bit-rate signals: The pulse generator must be accurately controlled. Thus, two "fast" devices, i.e., devices suitable for high-bit-rate signals, are necessary in the optical receiver: the "fast" switch (NOLM) and the "fast" optical phase-locked loop. Such an optical receiver is expensive.

SUMMARY OF THE INVENTION

It is the object of the invention to provide a demultiplexing apparatus in which the pulse generator can be controlled with a small amount of circuitry. A demultiplexing apparatus which attains the object is an optical switching device having an input for the optical digital signal, an input for repetitive pulses produced by a pulse generator, and an output for a portion of the optical digital signal, characterized in that a phase control device is provided which controls the pulse generator in accordance with changes in the magnitude of an electric signal derived from the output of the optical switching device.

One advantage of the invention is that the control electronics of the demultiplexing apparatus needs to be designed for only low frequencies (e.g., less than 100 kHz) although the demultiplexing apparatus is suitable for signals in the Gb/s range.

BRIEF DESCRIPTION OF THE DRAWINGS

The invention will now be explained in more detail, by way of example, with reference to the accompanying drawing, in which.

BEST MODE FOR CARRYING OUT THE INVENTION

Figure 1:
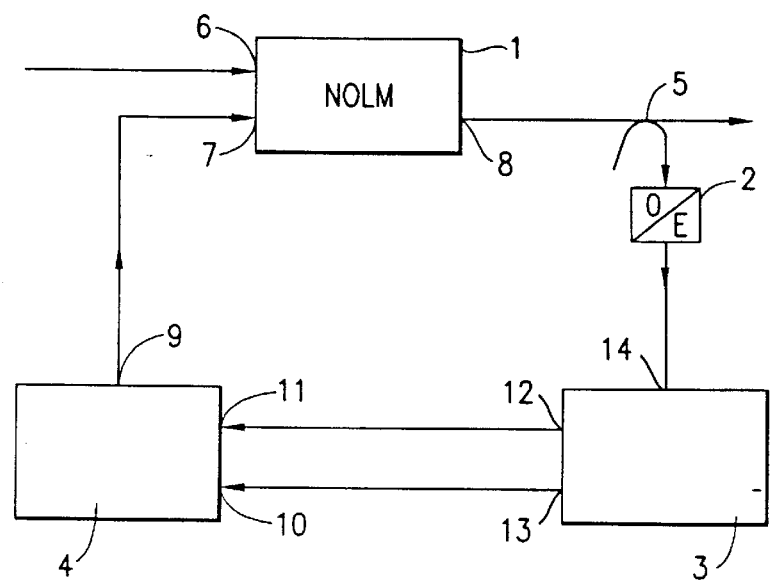
FIG. 1 is a block diagram of a demultiplexing apparatus.

FIG. 1 shows a block diagram of an apparatus for demultiplexing an optical digital signal with a fixed bit rate. An optical switching device 1 has an input 6 for the optical digital signal, an input 7 for a pulse produced by a pulse generator 4, and an output 8 for a removed portion of the optical digital signal. Connected to the output 8 of the optical switching device 1 is a coupler 5 which feeds a portion of the light (portion of the removed optical digital signal) to an optical-to-electrical transducer 2. The optical-to-electrical transducer 2 converts the light into an electric signal corresponding to the portion of the optical digital signal. The optical-to-electrical transducer 2 detects the average optical power. The electric signal delivered by it is applied to an input 14 of a phase control device 3. Outputs 13 and 12 of the phase control device 3 are coupled to inputs 10 and 11, respectively, of the pulse generator 4. An output 9 of the pulse generator 4 is connected to the input 7 of the optical switching device 1.

Figure 2:
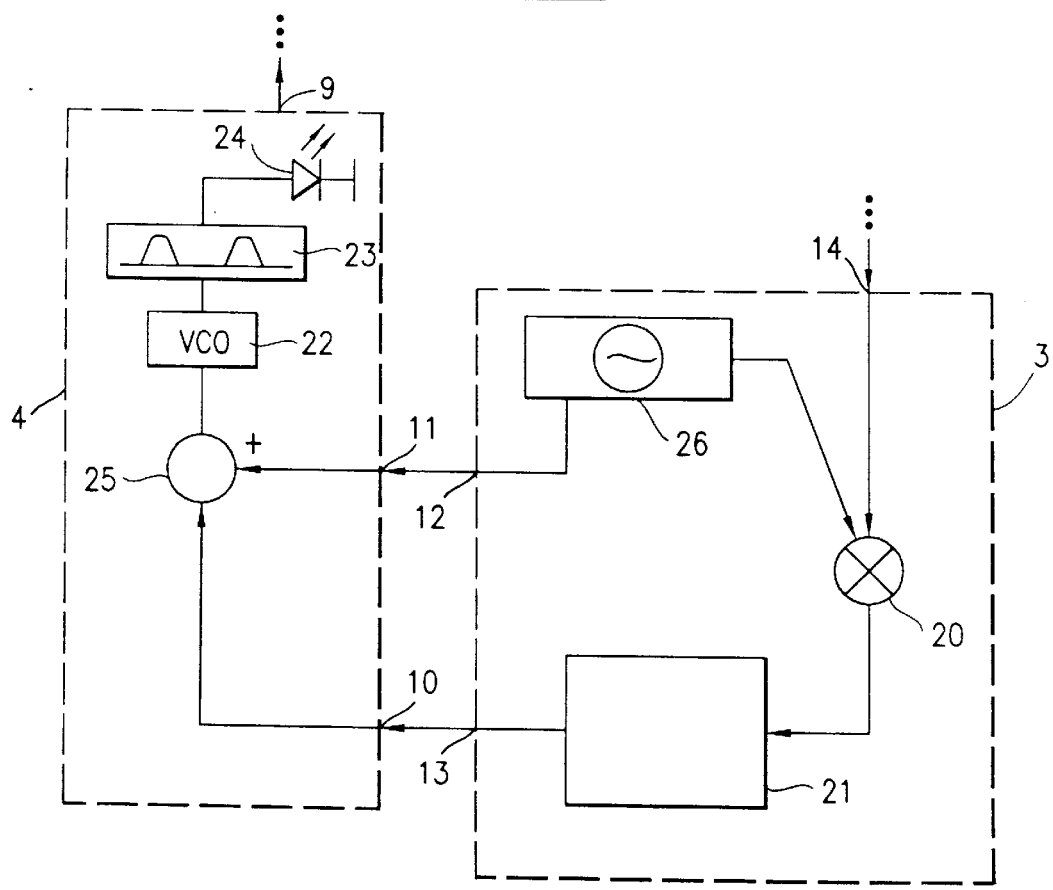
FIG. 2 shows details of the pulse generator and the phase control device of FIG. 1.

Before the operation of the demultiplexing apparatus according to the invention is explained, details of the pulse generator 4 and the phase control device 3 of FIG. 1 will be described with the aid of FIG. 2.

In the pulse generator 4, a voltage-controlled oscillator (VCO) 22 controls an electrical pulse generator 23, which generates an electric pulse with a repetition rate determined by the voltage-controlled oscillator 22. This pulse is applied to a laser diode 24, which converts it to an optical pulse, which then passes through an optical fiber to the input 7 (FIG. 1) of the optical switching device 1 (FIG. 1). An adder 25 in the pulse generator 4 adds two voltages coming from the inputs 10, 11 to form a tuning voltage for the voltage-controlled oscillator 22.

The phase control device 3 includes a noise source 26, e.g., a voltage generator which generates a sinusoidal alternating voltage with a frequency of, e.g., 100 kHz. With this sinusoidal alternating voltage, the operation of the pulse generator 4 is disturbed in a defined manner, namely so that the phase of the pulses changes periodically.

The phase control device 3 further comprises a mixer 20 and a controller 21, e.g., a PI controller. The mixer 20 mixes the electric signal coming from the optical-to-electrical transducer 2 (input 14) with the sinusoidal alternating voltage generated by the noise source 26. The mixer output is fed to the controller 21, which generates a control signal (control voltage) for the pulse generator 4.

The optical switching device 1 is preferably a nonlinear Sagnac interferometer (NOLM) as is known, for example, from T. Saito et al. It is also possible to use an optically nonlinear Mach-Zehnder interferometer, which is known from I. H. White et al., "Demonstration of the Optical Kerr Effect in an All-Fibre Mach-Zehnder Interferometer at Laser Diode Powers", ELECTRONICS LETTERS, 17th Mar. 1988, Vol. 24, No. 6, pages 340 to 341. Such a Mach-Zehnder interferometer comprises two optical-fiber arms, one of which uses nonlinear optical properties, for example.

Alternatively, use can be made of an electroabsorption modulator (EAM) as is known, for example, from F. Devaux et al., "Distribution of millimetre radiowave signals with an MQW electroabsorption modulator", ELECTRONICS LETTERS, 1st Sep. 1994, Vol. 30, No. 18, pages 1522 to 1524. Such an electroabsorption modulator is driven by an electric pulse, i.e., an electric pulse must be applied to the input 7 of the optical switching device. In that case, the pulse generator 4 has no laser diode 24.

The apparatus for demultiplexing a digital signal operates as follows.

A nonlinear Sagnac interferometer, hereinafter referred to as "NOLM", is used for the optical switching device 1. The input 6 of the optical switching device 1 receives an optical digital signal with a bit rate of, e.g., 2.48 Gb/s. Every 16th bit is to be removed, i.e., the portion of the optical signal appearing at the output 8 has a bit rate of 155 Mb/s. To accomplish this, the optical pulse produced by the pulse generator 4 and fed to the input 7 of the optical switching device 1 has a repetition rate of 155 MHz. According to the invention, the pulses are "wobbled" (at the frequency of the sinusoidal alternating voltage, e.g., 100 kHz) within a switching window, with the phase of the pulses being changed periodically. The switching window is the period within which removal of a bit is possible. As a result, pulses occur in the NOLM which lead or lag a light component of the optical digital signal within certain limits. A pulse lagging the light component does not overlap the light component as much as a parallel pulse would: The removed light power (output 8) is lower. As a result, the portion of the optical digital signal emerging at the output 8 of the optical switching device 1 is superposed with an amplitude modulation.

The amplitude of the electric signal provided by the optical-to-electrical transducer 2 changes at a frequency which is dependent on the phase difference between pulse and light component. Since the mixer 20 mixes the electric signal with the sinusoidal alternating voltage (frequency 100 kHz), the magnitude of the mixer output signal increases with the offset between the switching window and the bit to be removed, and the sign changes depending on whether the offset is positive (lead) or negative (lag). From this signal, which increases with the system deviation (corresponds to the phase difference), the controller 21 generates a control voltage with which the pulse repetition rate of the pulse generator 4 is controlled.

The noise source 26 need not necessarily be a voltage generator which generates a sinusoidal alternating voltage; it may also generate a sawtooth voltage, for example. What matters is that the pulse is disturbed in a defined manner and that the disturbance is effective at the output 8 of the optical switching device 1, so that the phase difference can be inferred therefrom.

From the foregoing description it is apparent that the optical switching device 1 has a dual function: it serves as an optical switch and as part of a phase-locked loop. Therefore, an additional "fast" optical phase-locked loop is not necessary.

I claim:

1. An apparatus for demultiplexing a fixed-bit-rate optical digital signal, comprising an optical switching device (1) having an input (6) for the optical digital signal, an input (7) for repetitive pulses produced by a pulse generator (4), and an output (8) for a portion of the optical digital signal, characterized in that a phase control device (3) is provided which controls the pulse generator (4) in accordance with changes in the magnitude of an electric signal derived from the output (8) of the optical switching device (1), wherein the portion of the optical digital signal provided by output (8) is the same as the optical digital signal arriving at input (6) a fraction of a period of time, the optical switching device (1) providing the portion of the optical digital signal at the output (8) over a plurality of successive periods of time.

2. An apparatus as claimed in claim 1 wherein the phase control device (3) includes a noise source (26) which interferes with the operation of the pulse generator (4) in a defined manner to change the phase of the pulses provided by the pulse generator.

3. An apparatus as claimed in claim 2 wherein the noise source (26) is a voltage generator which generates a sinusoidal alternating voltage.

4. An apparatus as claimed in claim 3 wherein the phase control device (3) further includes an electrical mixer (20), which mixes the electric signal derived from the output (8) of the optical switching device (1) with the sinusoidal alternating voltage from the noise source (26), and a controller (21), which provides a control voltage for the pulse generator (4) in response to changes in the magnitude of the mixer output signal.

5. An apparatus as claimed in claim 1, characterized in that the optical switching device (1) is an optically nonlinear Mach-Zehnder interferometer.

6. An apparatus as claimed in claim 1, characterized in that the optical switching device (1) is an electroabsorption modulator, and that the pulse generator (4) produces repetitive electric pulses.

* * * * *

UNITED STATES PATENT AND TRADEMARK OFFICE
CERTIFICATE OF CORRECTION

PATENT NO. : 5,774,246
DATED : June 30, 1998
INVENTOR(S) : Bulow

It is certified that error appears in the above-identified patent and that said Letters Patent is hereby corrected as shown below:

On the title page, item [56] "2736955" should read --2736966--.

Signed and Sealed this

Twenty-fifth Day of August, 1998

Attest:

BRUCE LEHMAN

Attesting Officer

Commissioner of Patents and Trademarks